(12) United States Patent
Takatsuji et al.

(10) Patent No.: US 8,786,260 B2
(45) Date of Patent: Jul. 22, 2014

(54) THERMAL CONTROL OF ELECTRIC STORAGE DEVICE

(75) Inventors: Hideyasu Takatsuji, Aki-gun (JP);
Michio Yoshino, Higashihiroshima (JP);
Seiji Sadahira, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 1162 days.

(21) Appl. No.: 11/769,425

(22) Filed: Jun. 27, 2007

(65) Prior Publication Data

US 2008/0012535 A1    Jan. 17, 2008

(30) Foreign Application Priority Data

Jul. 3, 2006 (JP) ................................ 2006-183838

(51) Int. Cl.
*H02J 7/00* (2006.01)
*B60H 1/00* (2006.01)
*H01M 10/50* (2006.01)

(52) U.S. Cl.
CPC ...... *B60H 1/00* (2013.01); *H01M 10/50* (2013.01)
USPC ........... 320/150; 320/151; 320/152; 320/153; 320/144

(58) Field of Classification Search
CPC ........... B60H 1/00; B60K 1/00; H01M 10/50; H02J 7/00
USPC .......... 320/153, 150, 151, 152, 154, 132, 144
See application file for complete search history.

(56) References Cited

U.S. PATENT DOCUMENTS

| 5,937,664 A | 8/1999 | Matsuno et al. | |
|---|---|---|---|
| 5,982,152 A * | 11/1999 | Watanabe et al. | 320/150 |
| 6,094,927 A | 8/2000 | Anazawa et al. | |
| 2005/0028542 A1 | 2/2005 | Yoshida et al. | |
| 2005/0269994 A1 | 12/2005 | Ishishita | |
| 2006/0036883 A1* | 2/2006 | Hashizumi et al. | 713/300 |
| 2006/0132100 A1* | 6/2006 | Tsubone | 320/150 |
| 2006/0176022 A1* | 8/2006 | Namba | 320/130 |

FOREIGN PATENT DOCUMENTS

| EP | 0964470 | 12/1999 |
|---|---|---|
| JP | 2005-063689 A | 3/2005 |
| JP | 2007049771 | 2/2007 |
| WO | 2007/086388 | 8/2007 |

* cited by examiner

*Primary Examiner* — Edward Tso
*Assistant Examiner* — Alexis Boateng
(74) *Attorney, Agent, or Firm* — Alleman Hall McCoy Russell & Tuttle LLP

(57) ABSTRACT

There is provided a method of thermally controlling an electric storage device. The method comprises increasing cooling medium supplied to the electric storage as an electric charge stored in the electric storage device increases. According to the method, by increasing the cooling medium supplied to the electric storage device as an electric charge stored in the electric storage device increases, the electric storage device may be kept at a temperature that increases the efficiency of charging or discharging the electric storage device. It is asserted to be more efficient to lower the temperature of the electric storage device when more electric charge is stored in the electric storage device. Also, an adequate amount of the cooling medium may be supplied to the electric storage. As a result, the overall efficiency of the electric system may be improved.

20 Claims, 7 Drawing Sheets

THERMAL CONTROL OF ELECTRIC STORAGE DEVICE

BACKGROUND

The present description generally relates to an electric storage device such as a battery, and more particularly relates to thermal control of an electric storage device which supplies power to propel a vehicle and stores power recovered during vehicle deceleration.

Electric systems that include an electric storage device or battery for propelling a hybrid electric vehicle are known and presented, for example in Japanese Patent Application Publication 2005-63689A. In one example, the battery discharges electricity to propel the vehicle. The battery can also be charged with electric power that is recovered during the vehicle deceleration. These discharging and charging cycles are repeated during travel of the vehicle, which can cause a temperature of the battery to increase. When a temperature of the battery is higher, an internal resistance of the battery is lower and the efficiency of charging and discharging is increased.

However, when the battery temperature goes above a certain level, it may cause the battery electrolyte to degrade. As a result, the efficiency of charging and discharging the battery may be reduced. Therefore, it is desirable to keep the battery at an efficient operating temperature that is below the level at which the battery electrolyte degrades. To address this issue, the '689 publication discloses a method of cooling the battery by using a cooling fan driven by an electric motor when the battery temperature exceeds a threshold temperature.

According to the prior art method, by cooling the battery so as to keep the battery temperature below a threshold temperature, the battery charging and discharging efficiency degradation that can occur at the higher battery temperature may be reduced. However, there is still room for improvement. In the prior art method, the threshold temperature to cool the battery is fixed. This can cause the cooling fan to be operated more often than is needed to keep the discharging and charging efficiency during some conditions. On the other hand this can cause the cooling fan to operate less during other conditions, depending on the threshold temperature setting. More energy may be consumed to drive the cooling fan. Or, the battery temperature may increase more than desired, and the efficiency of charging and discharging may be degraded. As a result, the overall efficiency of the electric system may be degraded.

SUMMARY

Accordingly, there is provided, in one aspect of the present description, a method of thermally controlling an electric storage device. The method comprises increasing cooling medium supplied to the electric storage as an electric charge stored in the electric storage device increases.

According to the method, by increasing the cooling medium supplied to the electric storage device as the electric charge stored in the electric storage device increases, the electric storage device may be kept at a temperature that increases the efficiency of charging or discharging the electric storage device. The inventors herein assert that it is more efficient to lower the temperature of the electric storage device when more electric charge is stored in the electric storage device. Also, an adequate amount of the cooling medium may be supplied to the electric storage device to regulate its temperatures. As a result, the overall efficiency of the electric system may be improved.

In a second aspect of the present description, there is provided a method of thermally controlling the electric storage device. The method comprises maintaining a temperature of said electric storage device at a first temperature, and decreasing the temperature of said electric storage device to a second temperature as an electric charge stored in the electric storage device increases. According to the second aspect, the electric storage device can be kept at the temperature that decreases as more electric charge is stored in the electric storage device. Consequently, for the same reason as in the first aspect, the overall efficiency of the electric system may be improved.

In an embodiment, the temperature of the electric storage device may be maintained substantially at the first temperature, for example, by detecting a temperature of the electric storage device and regulating the amount of cooling medium supplied to the electric storage device in accordance with the difference between the detected temperature and the first temperature.

BRIEF DESCRIPTION OF THE DRAWINGS

The advantages described herein will be more fully understood by reading examples of embodiments in which the above aspects are used to advantage, referred to herein as the Detailed Description, with reference to the drawings wherein.

DETAILED DESCRIPTION

Figure 1:
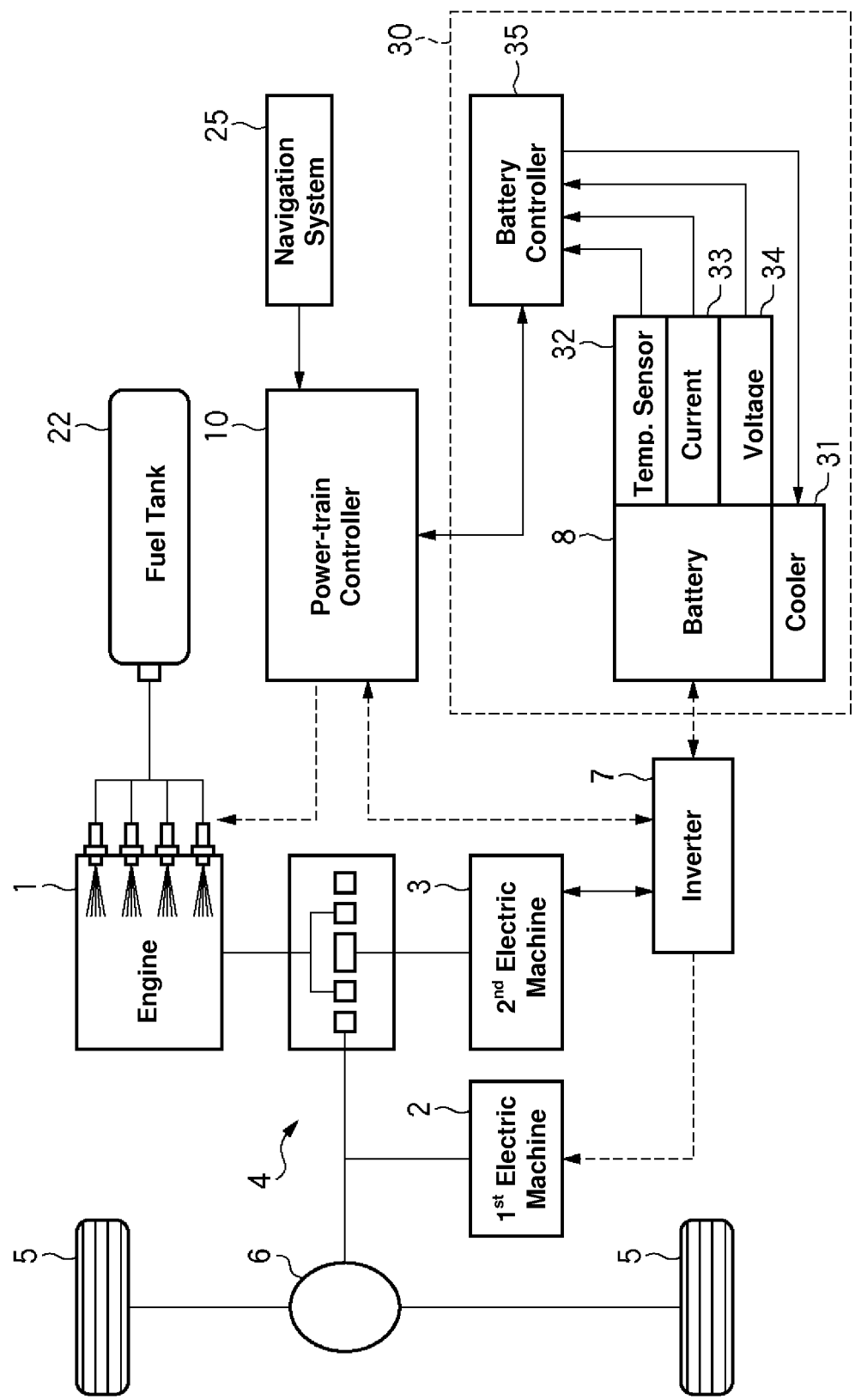
FIG. 1 shows a schematic view of a hybrid electric vehicle (HEV) power-train according to an embodiment of the present description.

An embodiment of the present description will now be described with reference to the drawings, starting with FIG. 1, which shows a power-train system of a hybrid electric vehicle (HEV). The HEV power-train comprises an internal combustion engine 1, a first electric machine 2, and a second electric machine 3, all of which are coupled through a power transmission mechanism 4 described in greater detail below to a differential gear set 6 arranged between driving wheels 5.

The internal combustion engine 1 combusts fuel such as gasoline supplied from a fuel tank 22 to combustion chambers of the engine 2 and generates torque as is known in the art. The first and second electric machines 2 and 3 can generate torque when electricity is supplied and generate electricity when torque is supplied as is known in the art.

The first and second electric machines 2 and 3 are electrically coupled to an inverter circuit 7 which is under control of a power-train controller 10. An electric storage device or battery 8 is also electrically coupled to the inverter circuit 7. By controlling the inverter circuit 7, electricity is transferred between these three electrical elements, i.e., the first electric machine 2, the second electric machine 3 and the battery 8. For instance, the second electric machine 3 generates electricity, and it is supplied to charge the battery 8 and/or drive the first electric machine 2. In another instance, electricity discharged from the battery 8 is supplied to the first electric machine 2 to drive the wheels 5 or the second electric machine 3 to crank the engine 1.

Figure 2:
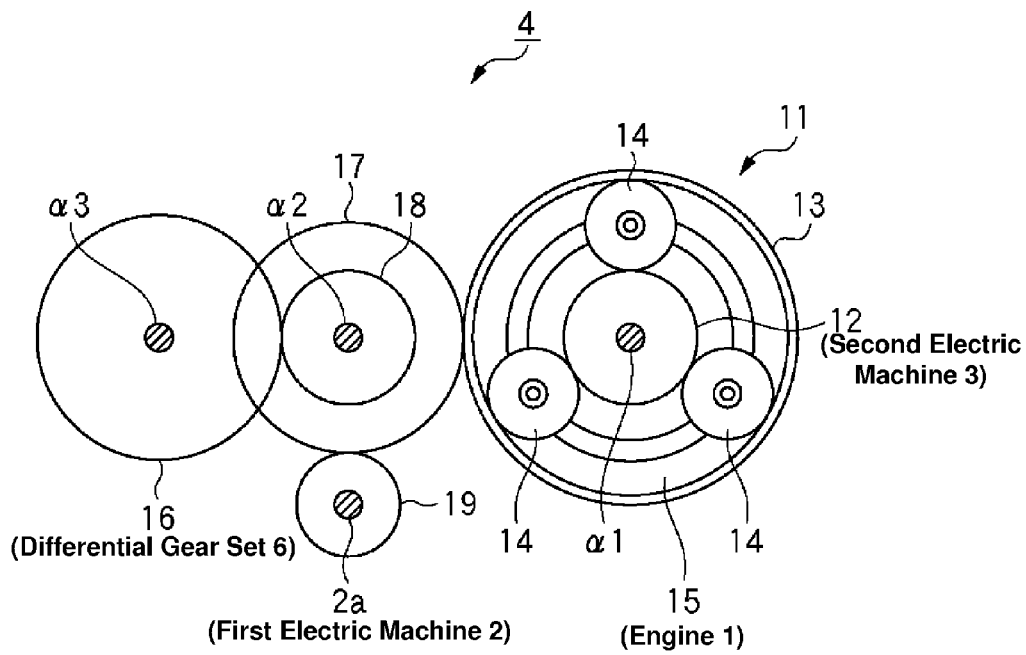
FIG. 2 shows a schematic view of a power transmission mechanism of the HEV power-train according to the embodiment.

As shown in FIG. 2, the power transmission mechanism comprises a planetary gear set 11. It has a sun gear 12, a ring gear 13 and a planetary carrier 15 which constitute of three rotational elements of the planetary gear set 11. The planetary carrier 15 rotationally supports a plurality of pinions 14 which engage with both of the sun gear 12 and the ring gear 13. An output shaft of the engine 1 is coupled to the planetary carrier 15 so as to integrally rotate with each other. The first electric machine 2 is coupled to the sun gear 12 so as to integrally rotate with each other.

Two rotational shafts $\alpha2$ and $\alpha3$ are arranged in parallel with a rotational shaft $\alpha1$ of the planetary gear set 11 which is a rotational shaft of the sung gear 12. The rotational shaft $\alpha3$ is a rotational shaft of the differential gear set 6 illustrated with its input gear 16. Large and small gears 17 and 18 are affixed to the rotational shaft $\alpha2$ so as to rotate integrally with each other. The larger gear 17 engages with the ring gear 13 of the planetary gear set 11. The smaller gear 18 engages with the input gear 16 of the differential gear set 6. Further engaged with the large gear 17 is a gear 19 affixed to a rotational shaft 2a of the first electric machine 2.

Power input from the engine 1 to the planetary carrier 15 is transferred through the planetary carrier 14, the ring gear 13, the large gear 17 and the small gear 18 to the input gear 16 of the differential gear set 6. Power input from the first electric machine 2 to the large gear 18 is transmitted through the small gear 17 to the input gear 16 of the differential gear set 6. Power input from the second electric machine 3 to the sun gear 12 is transmitted through the planetary pinions 14 to the planetary carrier 15 or the engine 1 so as to regulate rotation of the engine 1, and it can be regulated by controlling the inverter circuit 7. Therefore, by varying relationship of the torques from the three rotational elements of the planetary gear set 11, for example by changing power from the second electric machine 3, the planetary gear set 11 functions as a power transmission mechanism with continuously variable gear ratio (continuously variable transmission: CVT).

On the other hand, power from the driving wheels 5 is transmitted through the input gear 16 of the differential gear set 6, the small gear 18 and the large gear 17 to the gear 19 of the first electric machine 2 and drives the first electric machine 2 to generate electricity during the vehicle deceleration. Also, the power from the driving wheels 5 is transmitted to the ring gear 13 of the planetary gear set 11 and is rotating either or both of the sun gear 12 and the planetary carrier 15. When the engine 1 is stopped and the carrier 15 is stopped during the vehicle traveling, the engine's frictional resistance continues it to be stopped, and the sun gear 12 and the second electric machine 3 are freely rotating. Then, the inverter circuit 7 may regulate the free rotation of the second electric machine 3 by forcing it to generate electricity, its rotational speed falls, and a speed of the engine 1 and the carrier 15 increases. Therefore, this strategy may be used for cranking the engine 1 when the vehicle is traveling. When the vehicle is stopped and the ring gear 13 does not rotate, the inverter circuit 7 may supply electricity from the battery 8 to the second electric machine 3 to increase its speed and crank the engine 1.

There are three driving modes in the HEV power-train described above, that is, with only the engine 1, with both the engine 1 and the first electric machine 2, and with only the first electric machine 3. One of the three driving modes is chosen in accordance with a driving condition of the vehicle, as known in the art.

Referring back to FIG. 1, the power-train controller 10 is connected to various actuators and sensors and controls the fuel injectors of the engine 1 and other actuators to regulate torque output from the engine 1 based on signals input from an airflow meter which detects airflow inducted into the engine 1 and other sensors, as known in the art. It also controls the inverter circuit 7 as described above based on various signals. Therefore, the power-train controller 10 controls directly the engine 1 and indirectly the first and second electric machines 2 and 3 through the inverter circuit 7 so that the overall HEV power-train can operate efficiently.

For further improving the efficiency of the HEV power-train, the power-train controller 10 communicates with a vehicle navigation system 25. As known in the art, the vehicle navigation system 25 is configured to receive signals from Global Positioning System (GPS) satellites and computes an own position of the vehicle. And, it has a map in its memory, and an operator can input a desired travel route on the map to the system. The map of the navigation system is three-dimensional so that a road grade on the travel route can be determined.

Still referring to FIG. 1, a battery thermo control system 30 includes a cooler or cooling system 31, a temperature sensor 32 which detects a temperature of the battery 8, a current sensor 33 which detects current through the battery 8, a voltage sensor 34 which detects terminal voltage across the battery 8. The battery temperature control system 30 further includes a battery controller 35 which controls the cooling system 31 based on signals input from the temperature sensor 32, the current sensor 33 and the voltage sensor 34. The battery controller 35 computes a state of charge (SOC) of the battery 8 or amount of charge stored in the battery 8 based on the signals input from the current sensor 33 and the voltage sensor 34. The battery controller 35 uses the computed SOC internally as described in greater detail below as well as outputs it to the power-train controller 10 which controls the inverter circuit 7 for higher efficiency of the HEV power-train system.

Based on the state of charge or SOC input from the battery controller 35, the power-train controller 10 controls the inverter circuit 7 also for maintaining a appropriate SOC or the battery 8, which may be a range between 20 and 80% of the full charge capacity, for example. The battery 8 repeats to be charged and discharged depending on the vehicle driving condition including deceleration for charging. As a result, the SOC greatly may vary depending on the vehicle driving condition, and it is not easy to predict how the SOC is going to be. By taking into account of the SOC input from the battery controller 35, the power-train controller 10 may prevent an overcharging or over-discharging state of the battery 8 during the repeated charging and discharging while the vehicle is traveling.

The battery controller 35 communicates with the power-train controller 10 for the SOC as described above, and the information from the navigation system 25 may be input to the battery controller 35 through the HEV power-train controller 10.

Figure 3:
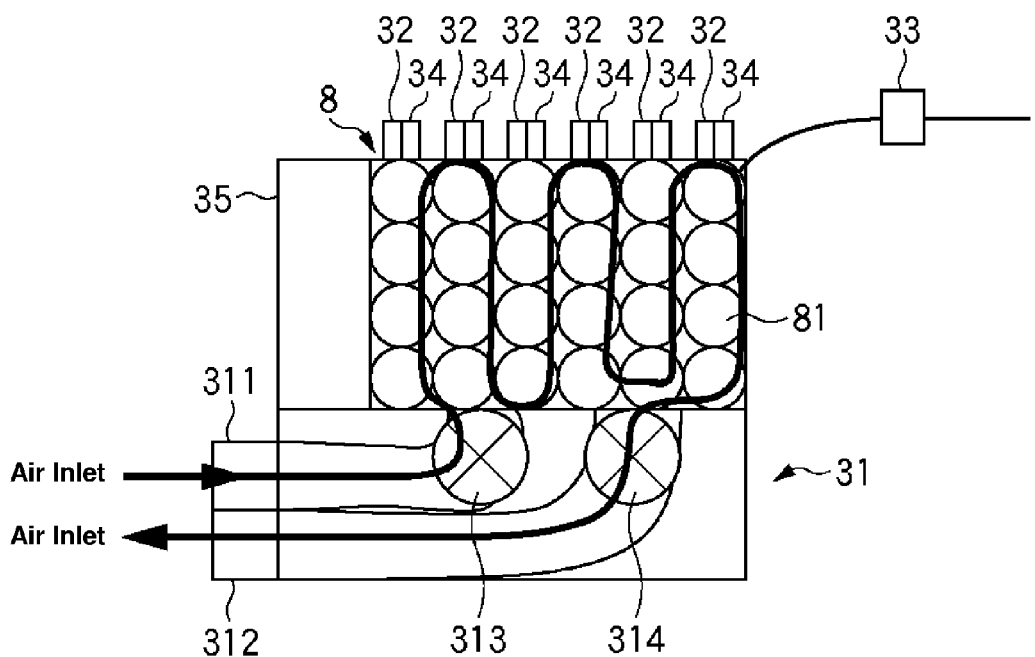
FIG. 3 shows a schematic view of a cooling system for an electric storage device or battery of the HEV power-train according to the embodiment.

Referring to FIG. 3, there are shown the battery 8, the temperature control system 30, the cooling system 31 and other related components. The cooling system 31 is attached to a side of the battery 8. Formed on the cooling system 31 are an air intake 311 and an air outlet 312. There are provided cooling fans 313 and 314 arranged respectively between the air intake 311 and the battery 8 and between the battery 8 and the air outlet 312 for forced air cooling of the battery 8. The cooling fans 313 and 314 are driven by electric motors not shown which operate with electricity supplied under control of the battery controller 35. The battery controller 35 may be arranged on another side of the battery 8.

In this embodiment, the battery 8 is a nickel hydride cell having a plurality of cylinder-shaped cell modules 81 arranged in matrix. When the cooling fans 313 and 314 are operated, air flow is formed between the cell module rows of the battery 8 as shown by arrows in FIG. 3 for the forced cooling.

The current sensor 33 is arranged in series with a cable coupled to a terminal of the battery 8. The temperature sensor 32 and the voltage sensor 34 are respectively provided in plural and for each of the cell module rows as illustrated. All signals from these sensors are input to the battery controller 35.

The battery 8 is not limited to the nickel hydrate cell described above, but a lithium battery or any other type of battery pertinent to the application may be used. Also, the cooling system 31 is not limited to of the air cooling type described above and using atmospheric air as cooling medium, but it may be of a liquid cooling type using liquid as cooling medium or further cool the cooling medium, for example, by using a thermoelectric couple such as Peltier element.

Figure 4:
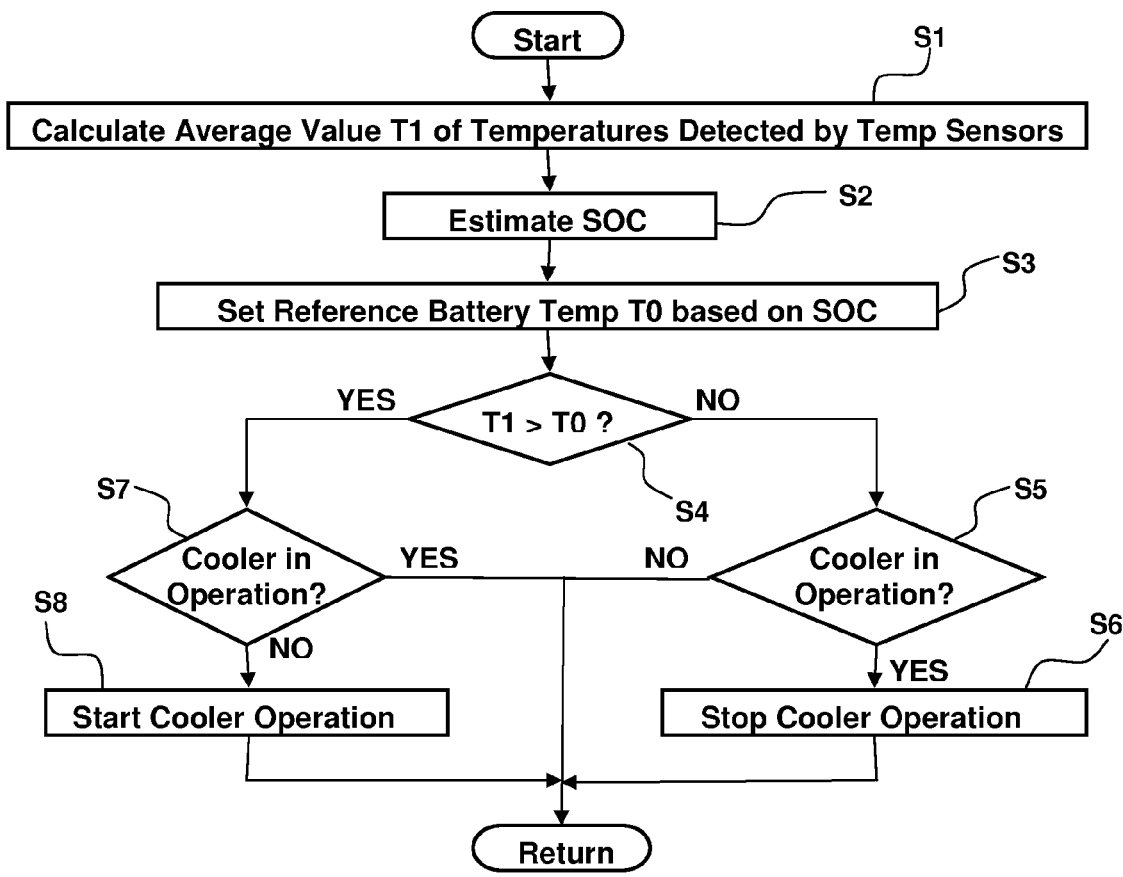
FIG. 4 shows a flowchart of a control routine executed by a battery controller of the HEV power-train according to the embodiment.

Referring to FIG. 4, there is shown a control routine the battery controller 35 executes for controlling the temperature of the battery 8. The control routine is repeatedly executed in a predetermined cycle time beginning at time when the ignition switch of the vehicle is turned on until it is turned off.

After the start, first at a step S1, the battery controller 35 reads temperatures detected by the temperature sensors 32 arranged in the respective cell module rows and calculates an average T1 of the read temperatures. Then, the routine proceeds to a step S2, and the battery controller 35 estimates SOC of the battery 8, for example, by multiplying a current detected by the current sensor 33 and an average of voltages detected by the voltage sensors 34. In other words, the estimation of SOC is based on history of charging and discharging of the battery 8. The SOC estimated here is output to the power-train controller 10 in addition to the internal usage as described above.

Then, the routine proceeds to a step S3, and the battery controller 35 sets a threshold battery temperature T0 for determining operation of the cooling system 31 based on the SOC estimated at the step S2. The threshold temperature T0 is read by referring to a look-up table MAP1 shown in Table 1 below and stored in the memory of the battery controller 35. The table MAP1 sets the threshold temperature T0 so that it gets lower as the SOC is higher while it gets higher as the SOC is lower, in particular, it is on a line B of FIG. 5. The line B is set just below a line A that shows temperatures at which the electrolyte can be decomposed.

TABLE 1

Look-Up Table MAP1

| SOC (%) | Battery Threshold Temp. T0 (° C.) |
|---|---|
| 20 | 40.0 |
| 20.1 | 39.8 |
| 20.2 | 39.7 |
| — | — |
| — | — |
| — | — |
| 40 | 35.5 |
| — | — |
| 60 | 29.5 |
| — | — |
| 80 | 25.0 |

Referring again to FIG. 4, after the step S3, the routine proceeds to a step S4 and determines whether the average temperature T1 determined at the step S1 is higher than the threshold value T0 determined at the step S3. If it is determined that the battery temperature T1 is not higher than the threshold value T0 at the step S4 (NO), it means that the decomposition of the electrolyte of the battery 8 does not occur, in other words, the charging/discharging efficiency does not decrease substantially, and the cooling system 31 is not to be operated to cool the battery 8. Then, the routine proceeds to a step S5 and determines whether the cooling system 31 is currently operated or not. If it is determined that the cooling system 31 is not currently operated at the step S5 (NO), the routine returns. Otherwise, it proceeds to a step S6, and the battery controller 35 controls the cooling system 31 to stop its operation.

When it is determined at the step S4 that the battery temperature T1 is higher than the threshold value T0 (YES), it means that the electrolyte of the battery 8 may be decomposed and the charging/discharging efficiency may be substantially decreased, and the cooling system 31 is to be operated to cool the battery 8. Then, the routine proceeds to a step S7 and determines whether the cooling system 31 is currently operated or not. If it is determined that the cooling system is currently operated at the step S7 (YES), the routine returns. Otherwise, it proceeds to a step S8, and the battery controller 35 controls the cooling system 31 to begin its operation.

When the cooling system 31 begins its operation, the battery controller 35 connects an electric power source such as a low voltage (12V) battery to the electric motors for the cooling fans 313 and 314 so that air or cooling medium flows from the air intake 311 through the matrix of the cell modules to the air outlet 312.

Figure 5:
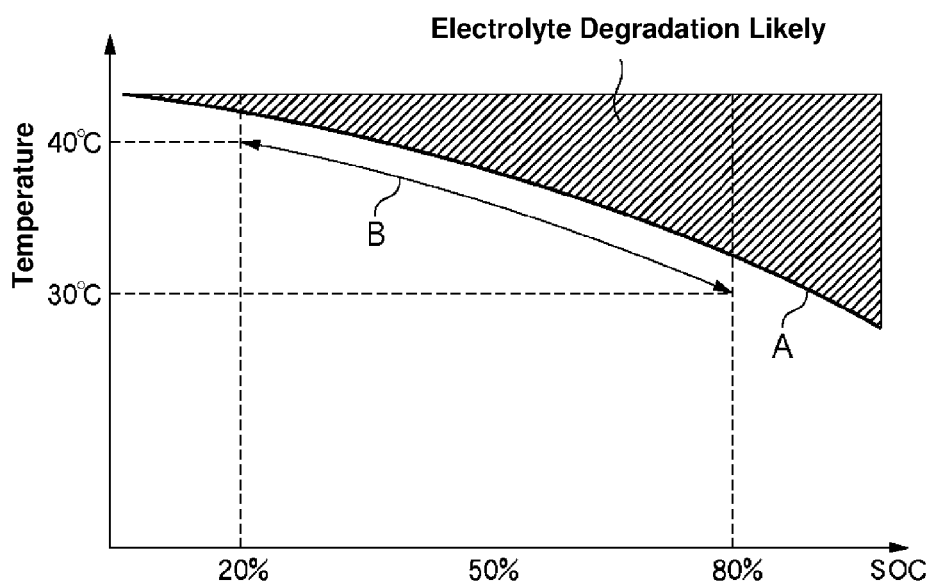
FIG. 5 is a diagram showing a relationship between desired temperatures and states of charge (SOC) of the battery.
Figure 6:
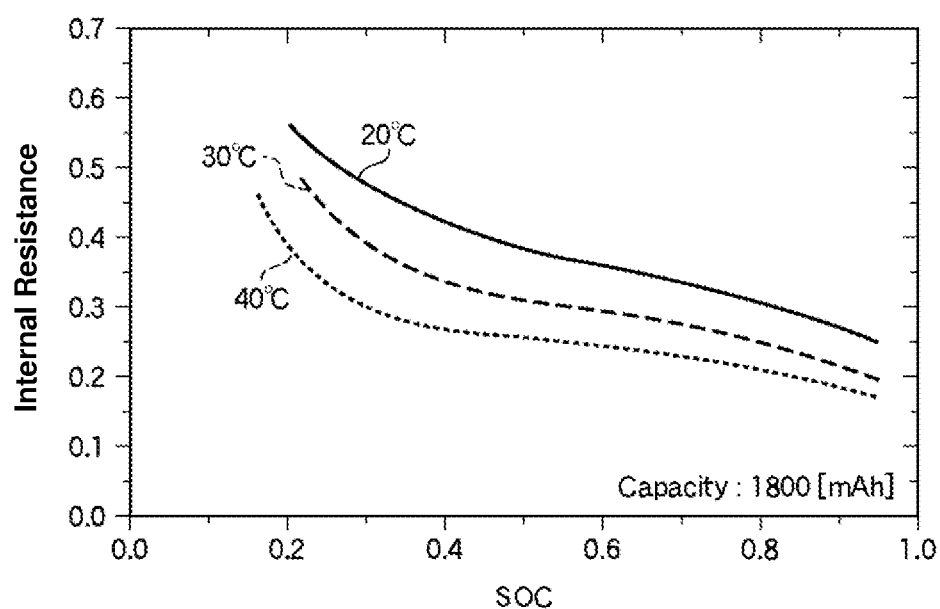
FIG. 6 is a diagram showing relationships between SOC and internal resistance of the battery for various battery temperatures.

No matter what the SOC is, as shown in FIG. 6, the internal resistance of the battery 8 is lower, in other words, the charging/discharging efficiency of the battery 8 is higher as the battery temperature is higher. However, when the battery temperature exceeds a certain temperature which varies in accordance with the SOC, the battery electrolyte starts to be degraded, for example, decomposed and the charging/discharging efficiency of the battery 8 starts to decrease, as shown in FIG. 5.

The routine of FIG. 4 varies the threshold battery temperature T0 so that it is lower as the SOC increases at the step S3 and operates the cooling system when the battery temperature T1 is determined to be higher than the threshold temperature T0 at the step S4. Therefore, the air or cooling medium supplied to the battery 8 is increased as the SOC of the battery 8 is higher. Consequently, the battery temperature may be kept high as long as it is not higher than the threshold temperature T0 which varies in accordance with the SOC of the battery 8 so that the charging/discharging efficiency of the battery 8 can be maintained higher. In practice, by executing the routine shown in FIG. 4, the actual temperature T1 may be maintained within 5° C. from the threshold value T0.

Figure 8:
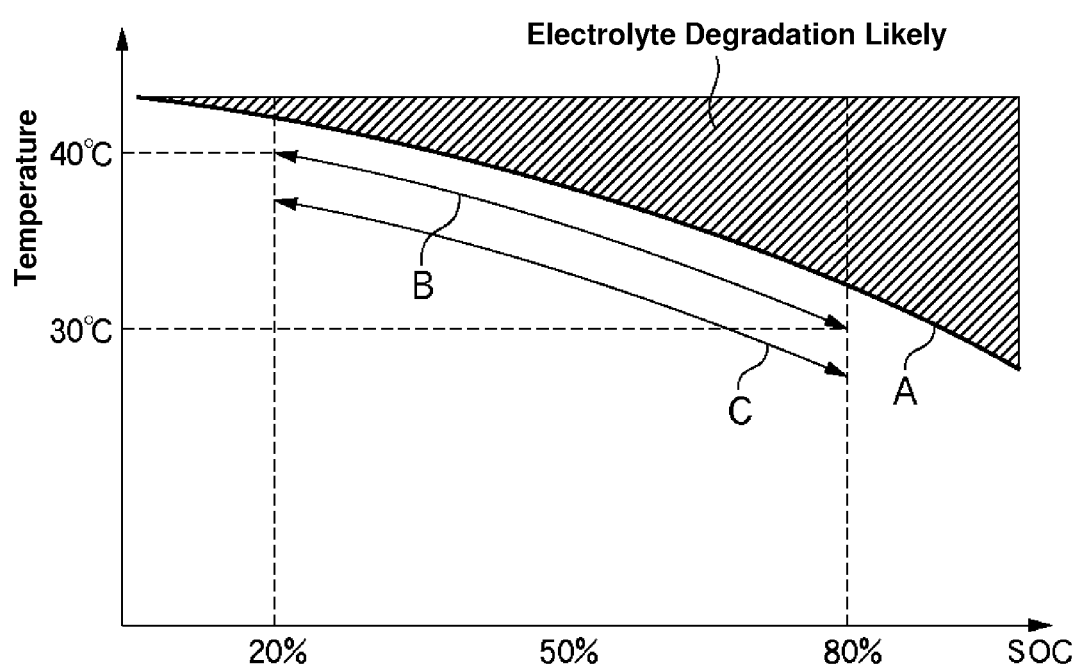
FIG. 8 is a diagram similar to that of FIG. 5 and corresponding to the second embodiment of the present description.

When the cooling system 31 begins the operation of the cooling fans 313 and 314, the temperature of the battery 8 may take some time to start falling after the beginning of the cooling fan operation. When the battery temperature is rising rapidly or the rapid temperature rise is expected, the cooling fans 313 and 314 may be started to operate in earlier timing. A second embodiment described below has a second lookup table MAP2 shown in Table 2 below and stored in the memory of the battery controller 35 in addition to the first lookup table MAP1. The second lookup table MAP2 has threshold temperatures T0 in accordance with the SOC which are on a line C in FIG. 8. The line C is offset below from the line B corresponding to the table MAP1. The tables MAP1 and MAP2 are switched for use depending on a change of the battery temperature T1.

TABLE 2

Look-Up Table MAP2

| SOC (%) | Battery Threshold Temp. T1 (° C.) |
|---|---|
| 20 | 38.0 |
| 20.1 | 37.8 |
| 20.2 | 37.6 |
| — | — |
| — | — |
| 40 | 33.5 |
| — | — |
| 60 | 27.5 |
| — | — |
| 80 | 23.0 |

Figure 7:
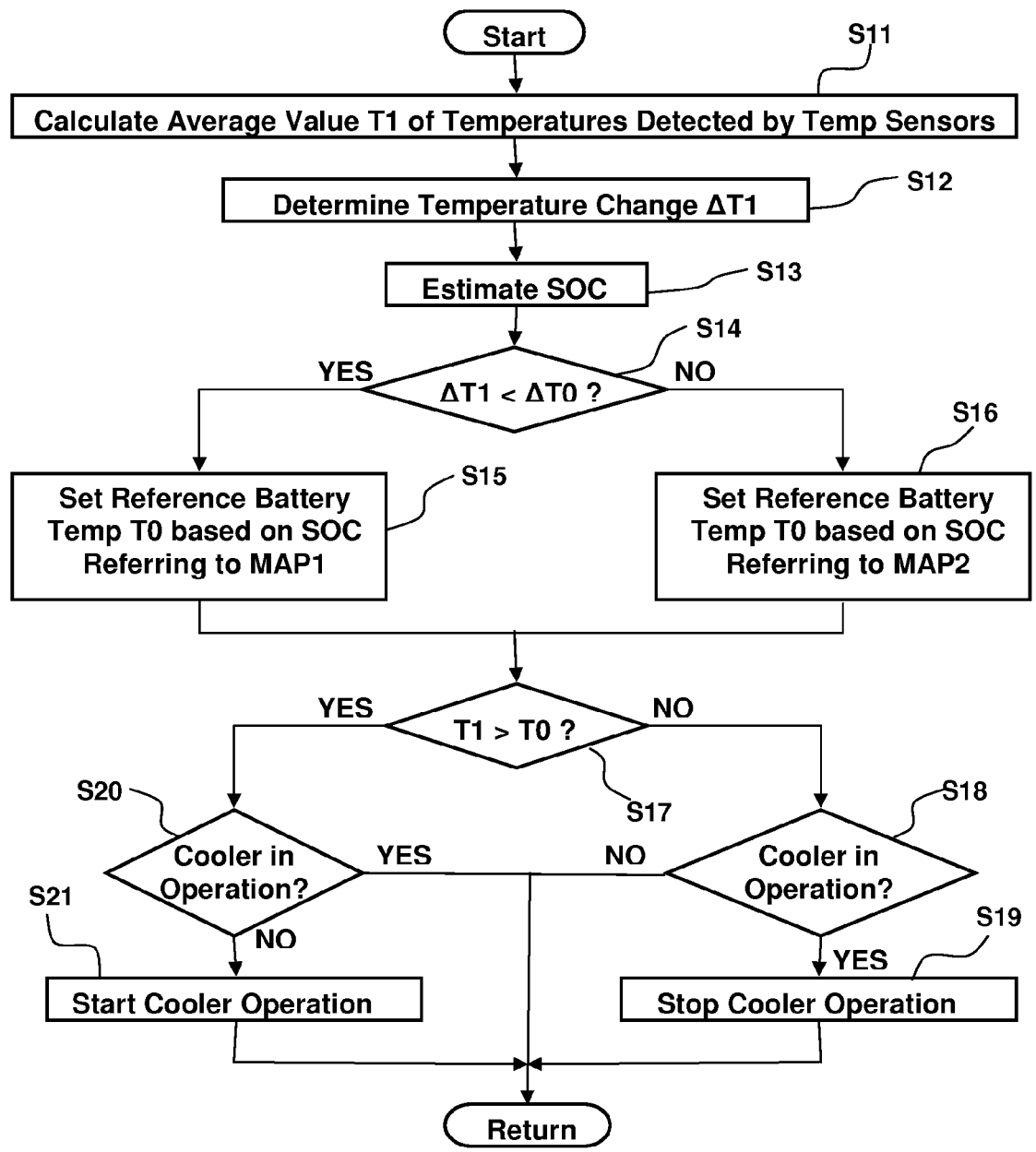
FIG. 7 shows a flowchart of a control routine executed by the battery controller according to a second embodiment of the present description.

Referring to FIG. 7, there is shown an alternative control routine the battery controller 35 executes according to the second embodiment. After the start, at a step S11, the battery controller 35 reads temperatures detected by the temperature sensors 32 arranged in the respective cell module rows and calculates an average T1 of the read temperatures. Then, the routine proceeds to a step S12, and the battery controller 35 computes a rate of change ΔT1 of the average temperature T1 of the battery 8 by reading out the temperature value T1 in the past, for example five seconds ago, which is stored in the memory of the battery controller 35 and comparing the current value (T1$_{CURRENT}$) and past values (T1$_{PAST}$), as known in the art and, for example, as shown below.

$$\Delta T1 = d(T1_{CURRENT} - T1_{PAST})/dt$$

After the step S12, the routine proceeds to a step S13 and the battery controller 35 estimates SOC of the battery 8 as described above in regard to the step S2 of the first embodiment. The estimated SOC is output to the power-train controller 10 in addition to the internal usage as described above. Then, the routine proceeds to a step S14 and determines whether the battery temperature change ΔT1 is less than a predetermined threshold rate of change ΔT0 or not.

When it is determined that the battery temperature change ΔT1 is less than the predetermined value ΔT0 (YES) at the step S14, which means there is no rapid increase of the battery temperature, the routine proceeds to a step S15 and sets the threshold value T0 corresponding to the SOC estimated at the step S13 by referencing to the table MAP1. On the other hand, when it is determined that the battery temperature change ΔT1 is not less than the predetermined value ΔT0 (NO) at the step S14, which means there is a rapid increase of the battery temperature, the routine proceeds to a step S16 and sets the threshold value T0 corresponding to the SOC estimated at the step S13 by referencing to the table MAP2.

After the step S15 and S16, the routine proceeds to a step S17 and determines whether the average battery temperature T1 determined at the step S11 is higher than the threshold value T0 determined at the step S15 or S16. If it is determined that the battery temperature T1 is not higher than the threshold value T0 at the step S17 (NO), it means that the decomposition of the electrolyte of the battery 8 does not occur, in other words, the charging/discharging efficiency does not decrease substantially, and the cooling system 31 is not to be operated to cool the battery 8. Then, the routine proceeds to a step S18 and determines whether the cooling system 31 is currently operated or not. If it is determined that the cooling system 31 is not currently operated at the step S18 (NO), the routine returns. Otherwise, it proceeds to a step S19, and the battery controller 35 controls the cooling system 31 to stop its operation.

When it is determined at the step S17 that the battery temperature T1 is higher than the threshold value T0 (YES), it means that the electrolyte of the battery 8 may be decomposed and the charging/discharging efficiency may be substantially decreased, and the cooling system 31 is to be operated to cool the battery 8. Then, the routine proceeds to a step S20 and determines whether the cooling system 31 is currently operated or not. If it is determined that the cooling system is currently operated at the step S20 (YES), the routine returns. Otherwise, it proceeds to a step S21, and the battery controller 35 controls the cooling system 31 to begin its operation.

According to the control routine of the second embodiment, the battery temperature threshold value T0 is lowered when the rapid temperature increase of the battery 8 is anticipated by determining that the battery temperature change ΔT1 is greater than the predetermined value ΔT0. Therefore, the cooling fans 313 and 314 starts their operation at the earlier timing than when the battery temperature change ΔT1 is less, and the battery temperature T1 may be prevented from exceeding a temperature on the line A of FIG. 8 above which the decomposition of the battery electrolyte is more likely.

If differences of the threshold values T0 between the two tables MAP1 and MAP2 can be considered constant, the threshold values T0 can be set at the step S16 by simply adding a constant value to the value read from the table MAP1 instead of storing the table MAP2 in the memory.

To estimate a rapid temperature increase of the battery 8, there are alternative methods instead of computing the temperature change of the battery 8 according to the second embodiment. For example, the rapid temperature increase may take place when the HEV drives up or down a steep hill and the battery 8 is greatly charged or discharged. Therefore, a rapid temperature increase of the battery 8 can be expected when there is such a hill on the expected travel route of the HEV. A control routine according to a third embodiment is based on this respect and shown in FIG. 9.

Figure 9:
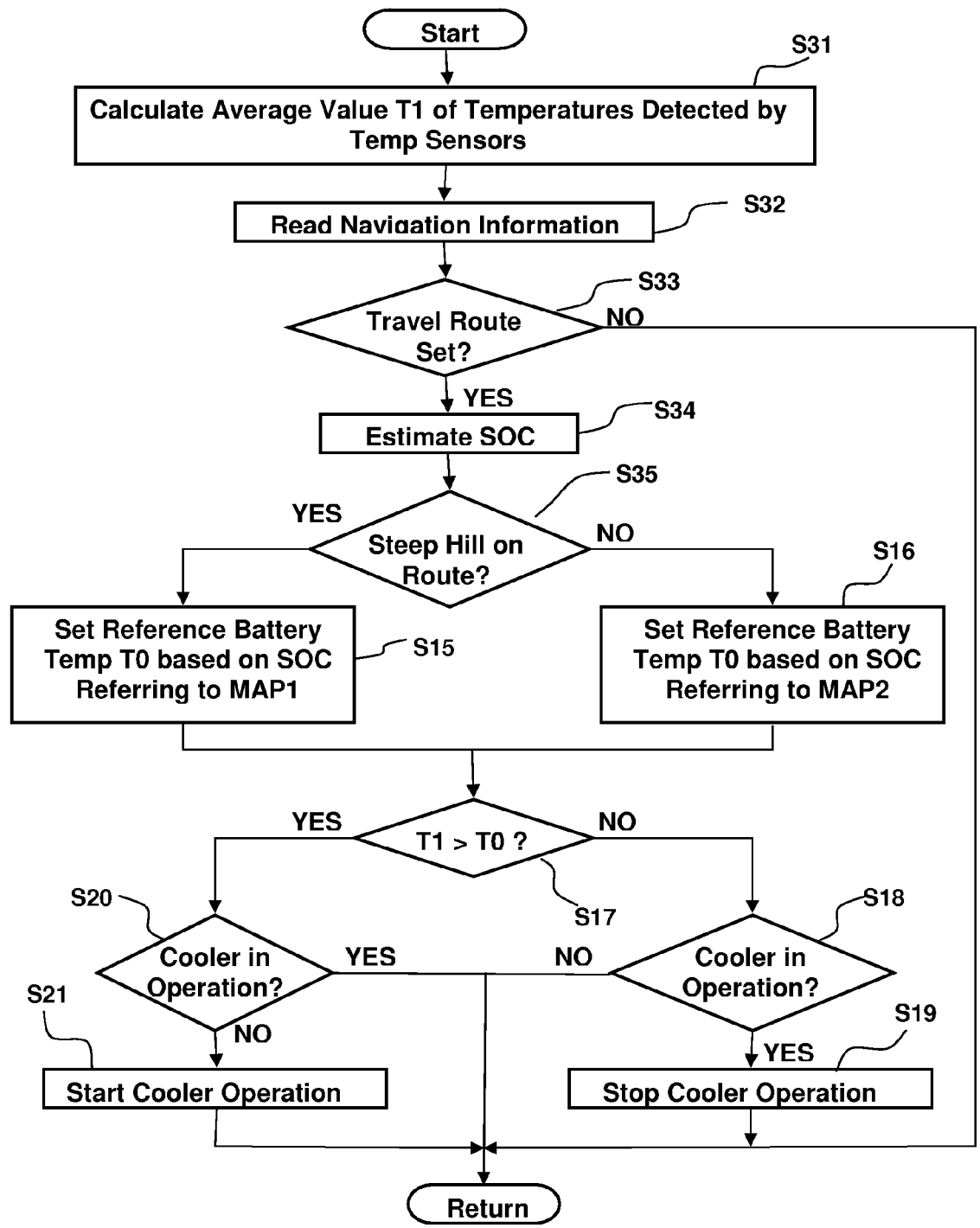
FIG. 9 is shows a flowchart of a control routine executed by the battery controller according to a third embodiment of the present description.

The control routine of FIG. 9 replaces the steps S11 through S14 of FIG. 7 with steps S31 through S34. The following processes at the steps S15 through S21 are the same, and only the steps S31 through S35 will now be explained. After the start, at a step S31, the battery controller 35 reads temperatures detected by the temperature sensors 32 arranged in the respective cell module rows and calculates an average T1 of the read temperatures. Then, the routine proceeds to a step S32, and the battery controller 35 reads vehicle navigation information through the power-train controller 10 from the vehicle navigation system 25. Next, the routine proceeds to a step S33 and determines from the read navigation information whether there is a set travel route or not.

When it is determined at the step S33 that there is no set travel route (NO), the routine returns and the battery controller 35 takes another control strategy such as shown in FIG. 4 or 7. Otherwise, the routine proceeds to a step S34, and the battery controller 35 estimates SOC of the battery 8 as at the step 2 of FIG. 4. Then, the routine proceeds to a step S35 and determines whether there is a steep uphill or downhill on the set travel route within a predetermined distance from the current position based on the information read at the step S33. The determination at the step S35 can be made, for example, by integrating absolute value of road grade within a predetermined distance on the set travel route from the current vehicle position and comparing the integrated absolute grade value with a predetermined threshold. When the absolute grade value is greater than the threshold, it is considered that there is a hill or are hills with certain grade on the route within the predetermined distance from the current position and that suggests an expected rapid temperature increase of the battery 8.

When it is determined at the step S35 that there is a steep hill (YES), the routine proceeds to the step S16 and sets the threshold temperature value T0 lower according to the table MAP2 so that the cooling fans 313 and 314 are operated before the expected rapid increase of the battery temperature. Otherwise, the routine proceeds to the step S15 sets the threshold temperature value T0 higher according to the table MAP1.

According to the third embodiment, a rapid increase of the battery temperature can be anticipated beforehand by using the navigation information.

It is needless to say that the invention is not limited to the illustrated embodiments. Therefore, alternative designs are possible without departing from the substance of the invention as claimed in the attached claims, as described below.

The table MAP1 or MAP2 in the above embodiments can be replaced with mathematical function which is approximated to relationship between the threshold temperature value T0 and the SOC such as shown by the line B in FIG. 5.

Instead of turning on and off the operation of the cooling fans 313 and 314 as in the embodiments, electricity supplied to the electric motors for the cooling fans 313 and 314 may be regulated depending on a difference between the current battery temperature T1 and the threshold temperature T0. In other words, the supply of cooling medium to the battery 8 may be feedback controlled to meet the battery temperature T1 to the threshold temperature T0. The feedback control can be a proportional control, an integral control, a differential control or any combination of these as is known in the art.

The invention claimed is:

1. A method of thermally controlling an electric storage device, comprising, in a control loop:
   estimating an electric charge stored in said electric storage device; and
   controlling a cooler to increase an amount of cooling medium supplied to said electric storage device as said estimated electric charge stored in said electric storage device increases.

2. The method as described in claim 1, further comprising: determining a temperature of said electric storage device; wherein controlling the cooler to increase the amount of cooling medium includes increasing the amount of cooling medium supplied to said electric storage device as said determined temperature of said electric storage device increases.

3. The method as described in claim 2, wherein controlling the cooler to increase the amount of cooling medium includes increasing the amount of cooling medium supplied to said electric storage device as a rate of temperature rise of said electric storage device increases.

4. The method as described in claim 1, further comprising:
   maintaining a temperature of said electric storage device at a first temperature; and
   decreasing the temperature of said electric storage device to a second temperature as the electric charge stored in said electric storage device increases.

5. The method as described in claim 1, wherein controlling the cooler to increase the amount of cooling medium includes increasing the amount of cooling medium supplied to said electric storage device as a temperature rise of said electric storage device is anticipated.

6. The method as described claim 5, wherein the temperature rise of said electric storage device is anticipated when charging of said electric storage device is expected.

7. The method as described in claim 6, wherein said electric storage device stores power recovered from a land vehicle, and the method further comprising determining if the charging of said electric storage device is expected based on a travel route of said land vehicle.

8. The method as described in claim 5, wherein the temperature rise of said electric storage device is anticipated when discharging of said electric storage device is expected.

9. The method as described in claim 8, wherein said electric storage device stores power to propel a land vehicle, and the method further comprising determining if the discharging of said electric storage device is expected based on a travel route of said land vehicle.

10. A method of thermally controlling an electric storage device, comprising, in a control loop:
    maintaining a temperature of said electric storage device at a first temperature;
    estimating an electric charge stored in said electric storage device; and
    controlling a cooler to decrease the temperature of said electric storage device to a second temperature as said estimated electric charge stored in said electric storage device increases.

11. The method as described in claim 10, wherein controlling the cooler to decrease the temperature of said electric storage device includes decreasing said first and second temperatures as a temperature rise of said electric storage device increases.

12. The method as described in claim 10, further comprising:
    estimating a future rise of temperature of said electric storage device;
    wherein controlling the cooler to decrease the temperature of said electric storage device includes decreasing said first and second temperatures as said estimated rise of temperature is greater.

13. A system comprising:
    an electric storage device capable of charging and discharging electricity;
    a cooling device capable of supplying cooling medium to said electric storage device;
    a controller configured to:
       estimate an electric charge stored in said electric storage device; and
       control said cooling device to increase an amount of the cooling medium supplied to said electric storage device as said estimated electric charge stored in said electric storage device increases.

14. The system as described in claim 13, further comprising:
- a voltage sensor detecting a voltage across said electric storage device, and
- wherein said controller is further configured to estimate said electric charge stored in said electric storage device based on said detected voltage.

15. The system as described in claim 13, further comprising:
- a voltage sensor detecting a voltage across said electric storage device; and
- a current sensor detecting current through said electric storage device, and
- wherein said controller is further configured to estimate said electric charge stored in said electric storage device based on said detected voltage and said detected current.

16. The system as described in claim 13, further comprising a temperature sensor detecting a temperature of said electric storage device, and wherein said controller is further configured to control said cooling device to increase the cooling medium supplied to said electric storage device as said detected temperature is higher.

17. The system as described in claim 13, further comprising a temperature sensor detecting a temperature of said electric storage device, and wherein said controller is further configured to:
- control said cooling device to supply the cooling medium to said electric storage device when said detected temperature is higher than a threshold temperature; and
- decrease said threshold temperature as the electric charge stored in said electric storage device increases.

18. The system as described in claim 17, wherein said controller is further configured to:
- determine a temperature rise of said electric storage device from the temperature of said electric storage device detected by said temperature sensor; and
- decrease said threshold temperature as said determined temperature rise of said electric storage device increases.

19. The system as described in claim 18, wherein said controller is further configured to decrease said threshold temperature when said determined temperature rise of said electric storage device is greater than a threshold rising rate.

20. The system as described in claim 19, further comprising:
- a vehicle power-train system configured to drive a land vehicle at least with electricity discharged from said electric storage device and charge said electric storage device; and
- a vehicle navigation system configured to identify a current position of said vehicle and a grade that said vehicle will encounter, and
- wherein said controller is further configured to decrease said threshold temperature as said identified grade is greater.

* * * * *